Figure 1:
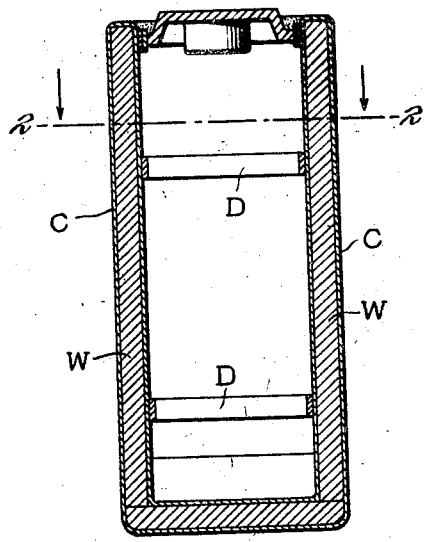

July 15, 1924.

L. LYNDON 1,501,352

CONTAINING CELL FOR ELECTRIC BATTERIES

Filed Dec. 23, 1919

WITNESSES:

INVENTOR

Patented July 15, 1924.

1,501,352

UNITED STATES PATENT OFFICE.

LAMAR LYNDON, OF NEW YORK, N. Y.

CONTAINING CELL FOR ELECTRIC BATTERIES.

Application filed December 23, 1919. Serial No. 347,011.

*To all whom it may concern:*

Be it known that I, LAMAR LYNDON, a citizen of the United States, residing in the city of New York, county and State of New York, have invented certain new and useful Improvements in Containing Cells for Electric Batteries, of which the following is a specification.

This invention relates to containing jars or cells for any form of electric battery, but finds its principal application to elements made of lead oxide immersed in dilute sulphuric acid, and has been developed more especially with a view to obviating certain difficulties which now exist in the smaller sizes of storage battery cells, which are customarily made of hard rubber.

A specific application of this invention is that of the production of storage batteries for starting and lighting purposes, on motor cars, but is equally applicable to other types of batteries.

The main objects of this invention are; to produce a battery container which will be durable, which is not subject to cracking and thereby allowing the electrolyte to drain out, and which shall be low in first cost, as compared with that of present types of battery containers.

Further objects of this invention will hereinafter appear.

Briefly, this invention comprises the construction of battery container of wood, steel or other suitable material having the desired dimensions, and the subsequent coating thereof with a material which is liquid or plastic and which substance subsequently becomes hard, although it may retain a certain amount of resiliency. The coating is impervious to acid and provides the necessary water-tight and acid-resisting qualities, while the container itself provides the strength required for the purpose intended.

In the specific application of this invention to the production of batteries having a plurality of cells, the preferable construction is to make the container of sufficient dimensions to contain all the elements, and place partitions in the container in such number as to form the desired number of cells. The entire structure, thus formed, is then coated with the impervious and acid-resisting substance, by spraying, dipping, or in any practical manner. This acid-resisting substance is, preferably, a material substantially comprising cellulose treated with a suitable acid which produces a chemical compound soluble in certain solvents and, when so dissolved and the solvent subsequently removed, leaves a substance corresponding, in its characteristics, to such materials as are known under the trade names of "celluloid", "pyralin", and the like.

The drawings, herewith, illustrate one method of application of this invention.

These drawings show the arrangements adapted for the usual standard lighting and starting battery for gasoline motor cars, but they illustrate equally well the application to single individual cells or to a greater number of cells connected either in series or in parallel. The present practice for gasoline motor-car service is to make batteries of three cells in series, giving approximately six volts.

In commercial practice, the coating of such acid-resisting material as hereinabove described will be very thin and if the battery elements inside the jar are subject to shaking, pounding or moving about, the thin protective coating will be abraded or broken through by the metallic edges of the elements and wherever such a break or abrasion is made the wooden core will be interposed to the action of the electrolyte which will result in the ultimate destruction of the containing cell.

In order to protect the thin acid-resisting coating against abrasion by the elements of the cell, I provide protecting ribs or strips which are placed between the elements and the inner walls of the container, these ribs or strips being of resilient acid-resisting material. With these in place, the elements cannot touch the walls of the containing vessel, being spaced therefrom by the ribs or bands.

The ribs may be formed by thickening the protecting coating itself or they may be formed separately and assembled with either the containing vessel or the elements.

Figure 3:
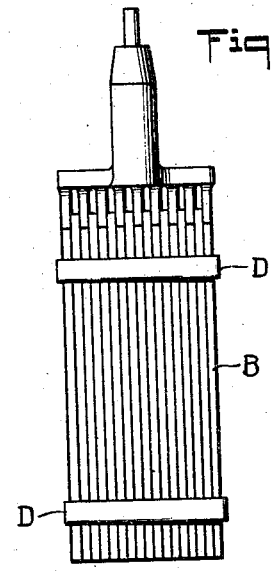
Figure 2:
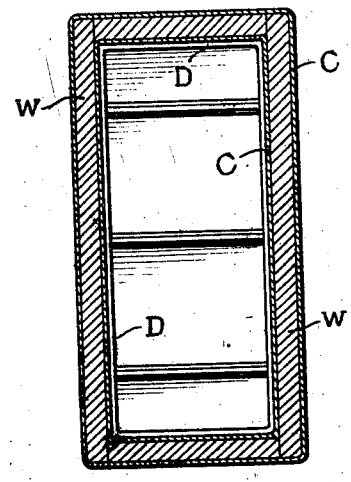

In the figures, Figure 1 shows a vertical transverse section through a battery jar, while Figure 2 shows a horizontal section on the line 2—2. Figure 3 is a front elevation, and Figure 4 a side elevation of a set of battery elements. In the figures, "B" are the battery elements, "W" is the core or material of which the cell is made, "C" is the thin protective coating, and "D" the protecting ribs or bands which surround the elements and are interposed between them and the inner walls of the containing vessel.

Figure 4:
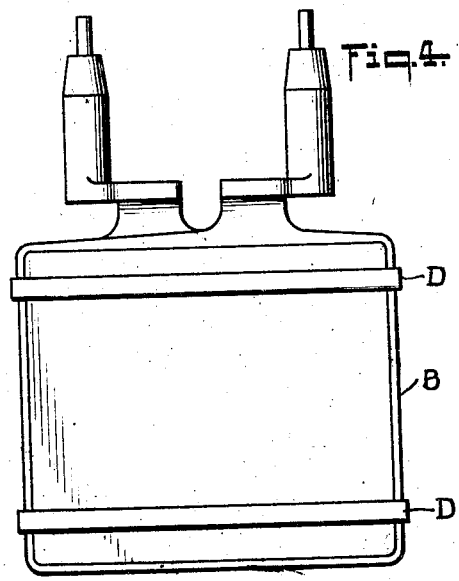

When these bands are made separately and not as a thickened portion of the protective coating, they may be either fastened to the inner wall of the containing vessel or fastened in position around the elements or simply held in position by friction with either the elements or the containing cell walls or both. Figures 1 and 2 show the condition of the protecting bands being held inside the containing vessel, while Figures 3 and 4 show the bands placed around the elements prior to the placing inside of the containing vessels.

Without enumerating equivalents and variations, I claim as my invention:

1. A battery container made of nonacid-resisting material and covered with a pyroxylin plastic, said pyroxylin plastic being thickened over certain predetermined areas.

2. A battery container made of nonacid-resisting material and covered with a film of an impervious acid-resisting substance, said film being throughout adhesive to, and integral with, said nonacid-resisting material, and protecting strips of acid-resisting material on the inner walls of said container.

3. A battery container made of nonacid-resisting material coated with a film of a pyroxylin plastic, said film being uniformly adhesive to, and integral with, said nonacid-resisting material, and a protecting strip of acid-resisting material on the inner wall of said container.

4. A battery container made of nonacid-resisting material coated with a film of a pyroxylin plastic, said film being throughout adhesive to, and integral with, said nonacid-resisting material, the thickness of said pyroxylin plastic being increased over certain predetermined areas, where the battery elements are adapted to rest against said areas.

5. A battery container having its inner walls coated with a film of a pyroxylin plastic, said film being throughout adhesive to, and integral with, said walls, said pyroxylin plastic being thickened over predetermined portions of said walls.

LAMAR LYNDON.

Witnesses:
ALEXANDER CHESSIN.
D. L. DOBYNS.